US009218260B2

(12) United States Patent
Hsieh et al.

(10) Patent No.: US 9,218,260 B2
(45) Date of Patent: Dec. 22, 2015

(54) HOST DEVICE AND METHOD FOR TESTING BOOTING OF SERVERS

(71) Applicant: HON HAI PRECISION INDUSTRY CO., LTD., New Taipei (TW)

(72) Inventors: Jui-Kun Hsieh, New Taipei (TW); Ho-Cheng Yang, New Taipei (TW); Chung-Lun Hsu, New Taipei (TW); Cheng-Yu Tsai, New Taipei (TW); Ming-Shang Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 179 days.

(21) Appl. No.: 14/135,586

(22) Filed: Dec. 20, 2013

(65) Prior Publication Data

US 2015/0121141 A1  Apr. 30, 2015

(51) Int. Cl.
*G06F 11/00* (2006.01)
*G06F 11/22* (2006.01)
*G06F 11/07* (2006.01)

(52) U.S. Cl.
CPC ........ *G06F 11/2284* (2013.01); *G06F 11/0757* (2013.01); *G06F 11/2268* (2013.01); *G06F 2011/2278* (2013.01)

(58) Field of Classification Search
CPC ............ G06F 11/0754; G06F 11/0757; G06F 11/076; G06F 11/0766; G06F 11/0769; G06F 11/2268; G06F 11/2284; G06F 11/2294; G06F 2011/2278

See application file for complete search history.

(56) References Cited

U.S. PATENT DOCUMENTS

| | | | | |
|---|---|---|---|---|
| 5,978,911 A * | 11/1999 | Knox et al. | | 713/1 |
| 5,978,939 A * | 11/1999 | Mizoguchi et al. | | 714/55 |
| 7,340,638 B2 * | 3/2008 | Nicholson et al. | | 714/6.11 |
| 7,895,472 B2 * | 2/2011 | Quach et al. | | 714/27 |
| 8,407,459 B2 * | 3/2013 | Okano | | 713/2 |
| 8,538,720 B2 * | 9/2013 | Hsu | | 702/119 |
| 2007/0174705 A1 * | 7/2007 | Shih | | 714/36 |
| 2009/0292911 A1 * | 11/2009 | Chien | | 713/2 |
| 2009/0292949 A1 * | 11/2009 | Quach et al. | | 714/36 |
| 2009/0300644 A1 * | 12/2009 | Lee et al. | | 718/106 |
| 2010/0211959 A1 * | 8/2010 | Chan et al. | | 718/107 |

* cited by examiner

*Primary Examiner* — Marc Duncan
(74) *Attorney, Agent, or Firm* — Novak Druce Connolly Bove + Quigg LLP

(57) ABSTRACT

In a method for testing booting of servers, the servers are controlled to boot and perform a booting test, and are controlled to quit the booting test and a current state of the booting test is stored in a test log, if the booting of one of the servers is unsuccessful. System logs of all of the servers are saved if the booting times of all of the servers do not exceed the first predefined time. An alarm device is controlled to alarm if the booting time of one of the servers exceeds the first predefined time but does not exceed the second predefined time. And the servers are controlled to quit the booting test if the booting time of one of the servers exceeds the first predefined time and further exceeds the second predefined time.

15 Claims, 4 Drawing Sheets

HOST DEVICE AND METHOD FOR TESTING BOOTING OF SERVERS

BACKGROUND

1. Technical Field

The embodiments of the present disclosure relate to a host device and a method for testing booting of servers.

2. Description of Related Art

Server manufacturers need to test booting of servers to verify quality of the servers. However, the test is usually manually performed, which is time-consuming and labor-consuming. In addition, booting time of the servers may appear slow and exceed a customer requirement, which may reduce quality of the servers.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, flash memory, and hard disk drives.

Figure 1:
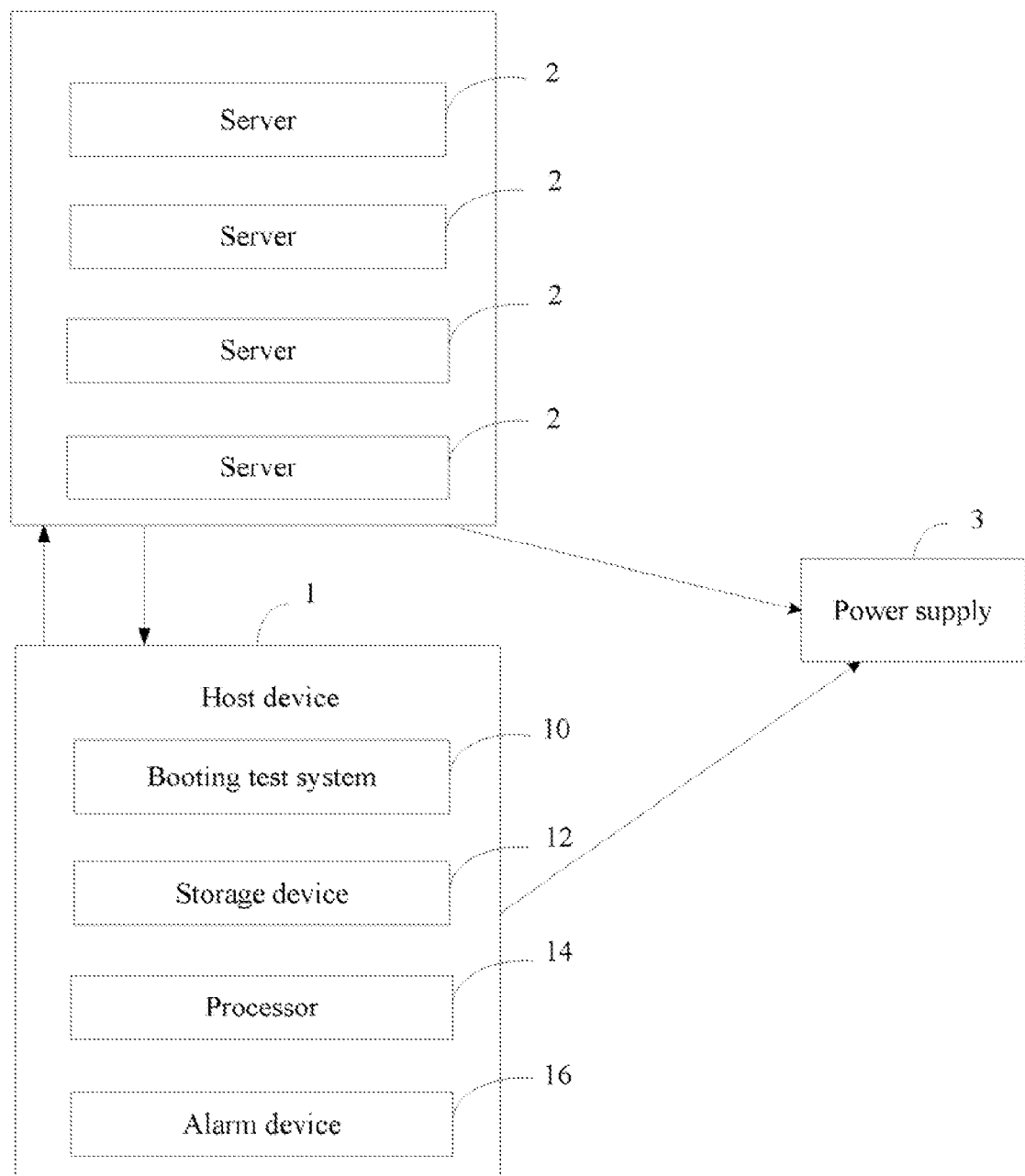
FIG. 1 is a block diagram of one embodiment of a host device including a booting test system.

FIG. 1 is a block diagram of one embodiment of a host device 1 including a booting test system 10, a storage device 12, at least one processor 14, and an alarm device 16. The host device 1 may be a desk computer, a notebook, a server, or other computer device. The host device 1 connects to a plurality of servers 2 and a power supply 3. The power supply 3 provides electric power for the servers 2.

In one embodiment, the storage device 12 (a non-transitory storage device) may be an internal storage system, such as a random access memory (RAM) for the temporary storage of information, and/or a read only memory (ROM) for the permanent storage of information. In some embodiments, the storage device 12 may be an external storage system, such as an external hard disk, a storage card, or a data storage medium.

The at least one processor 14 may include a processor unit, a microprocessor, an application-specific integrated circuit, and a field programmable gate array, for example.

The alarm device 16 generates an alarm if the booting time of one of the servers 2 exceeds a first predefined time but does not exceed a second predefined time.

The alarm device 16 also generates the alarm if the shutdown time of one of the servers 2 exceeds a third predefined time but does not exceed a fourth predefined time.

In the embodiment, the second predefined time is a maximum booting time allowed by a customer of the servers 2, and the first predefined time is less than the second predefined time. The fourth predefined time is a maximum shutdown time allowed by the customer of the servers 2, and the third predefined time is less than the fourth predefined time.

In one embodiment, the booting test system 10 includes a plurality of function modules which include computerized codes or instructions that can be stored in the storage device 12 and executed by the at least one processor 14 to provide a method for testing booting of servers 2.

Figure 2:
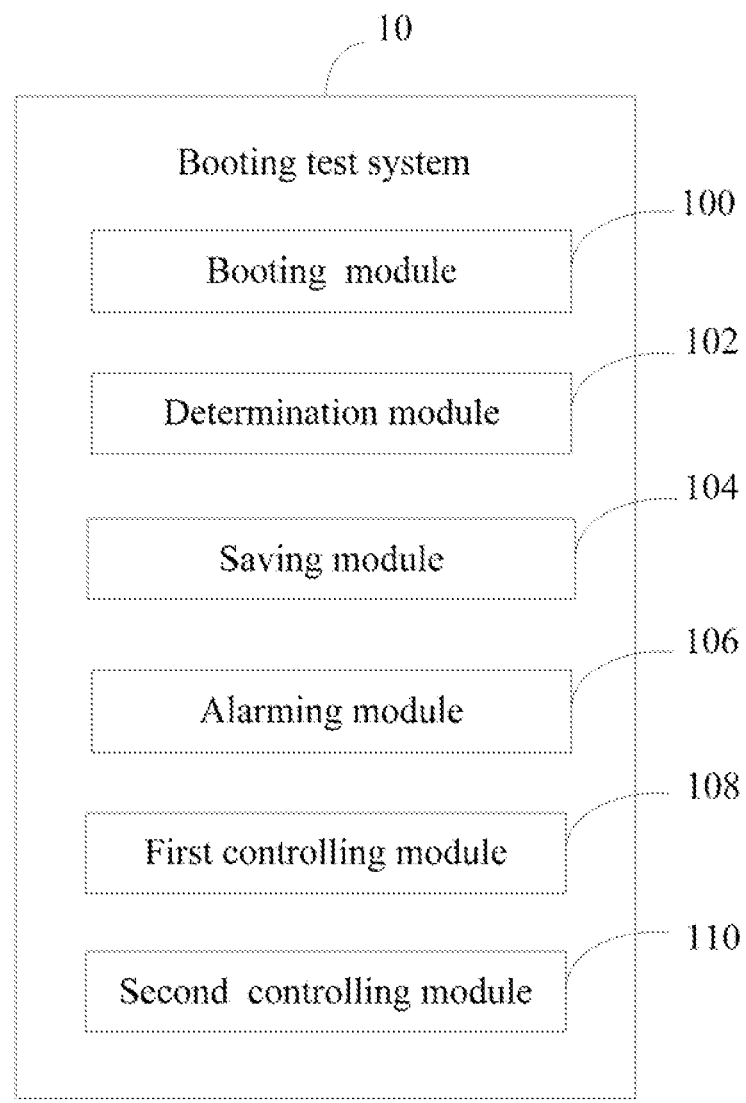
FIG. 2 is a block diagram of one embodiment of function modules of the booting test system in FIG. 1.

FIG. 2 is a block diagram of one embodiment of function modules of the booting test system 10 in FIG. 1. In the embodiment, the booting test system 10 includes a booting module 100, a determination module 102, a saving module 104, an alarming module 106, a first controlling module 108, and a second controlling module 110. The modules may comprise computerized codes in the form of one or more programs that are stored in the storage device 12 and executed by the at least one processor 14 to provide functions for implementing the booting test system 10. The functions of the function modules are illustrated in FIG. 3 and described below.

Figure 3:
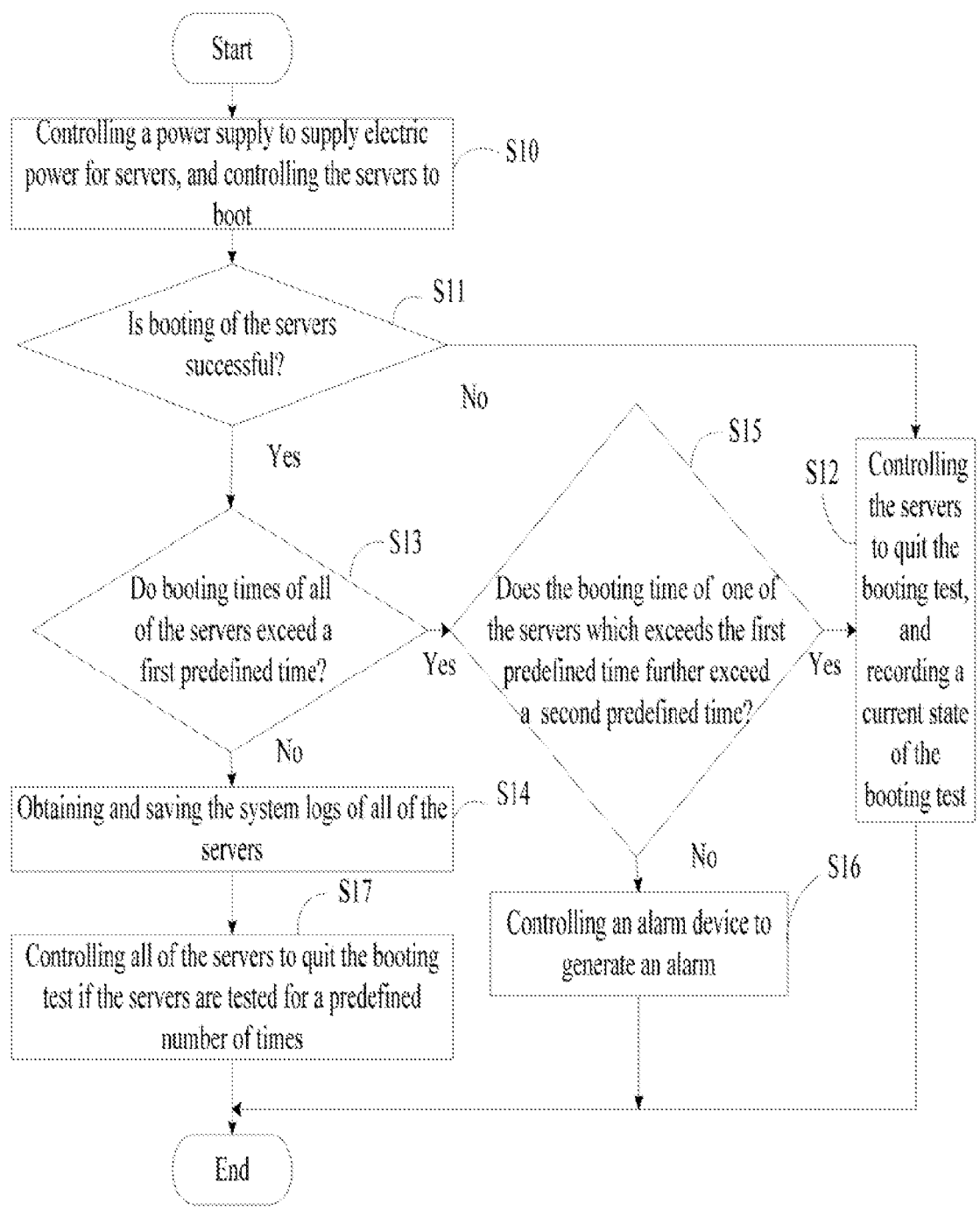
FIG. 3 is a flowchart of one embodiment of a method for testing booting of servers.

FIG. 3 is a flowchart illustrating one embodiment of a method for testing booting of the servers 2. Depending on the embodiment, additional steps may be added, others removed, and the ordering of the steps may be changed.

In step S10, the booting module 100 controls the

In step S11, the determination module 102 determines whether the booting of all of the servers 2 is successful. If the booting of all of the servers 2 is successful, S13 is implemented. Otherwise, if the booting of one of the servers 2 is unsuccessful, S12 is implemented. In the embodiment, each server 2 may send an information to the host device 1 to inform the host device 1 that the booting of the server 2 is successful after the booting of the server 2. If the host device 1 receives the information from all of the servers 2, the determination module 102 determines the booting of all of the servers 2 is successful. Otherwise, if the host device 1 does not receive the information from one of the servers 2, the determination module 102 determines the booting of the server 2 is unsuccessful.

In step S12, the saving module 104 controls all of the servers 2 to quit the booting test, and records a current state of the booting test in a test log stored in the storage device 12. In the embodiment, the current state of the booting test may indicate that the booting of one of the servers 2 is unsuccessful.

In step S13, the determination module 102 determines whether the booting times of all of the servers 2 exceed the first predefined time. If the booting time of all of the servers 2 do not exceed the first predefined time, step S14 is implemented. Otherwise, if the booting time of one of the servers 2 exceeds the first predefined time, step S15 is implemented. In the embodiment, the booting time may be defined as a time period between a time of supplying electric power for all of the servers 2 and connecting the servers 2 to the host device 1.

In step S14, the saving module 104 obtains system logs of all of the servers 2, and saves the system logs in the storage device 12.

In step S15, the determination 102 determines whether the booting time of the one of the servers 2 which exceeds the first predefined time further exceeds the second predefined time. If the booting time of one of the servers 2 exceeds the first predefined time and further exceeds the second predefined time, step S12 is implemented. If the booting time of the one of the servers 2 exceeds the first predefined time but does not exceed the second predefined time, step S16 is implemented.

In step S16, the alarming module 106 controls the alarm device 16 to alarm. In the embodiment, the alarm reminds the tester of the booting test that the booting time of the one of the servers 2 is too long.

In step S17, the controlling module 108 controls all of the servers 2 to quit the booting test if the servers 2 are tested for a predefined number of times. For example, the predefined number of times may be defined as three times.

Figure 4:
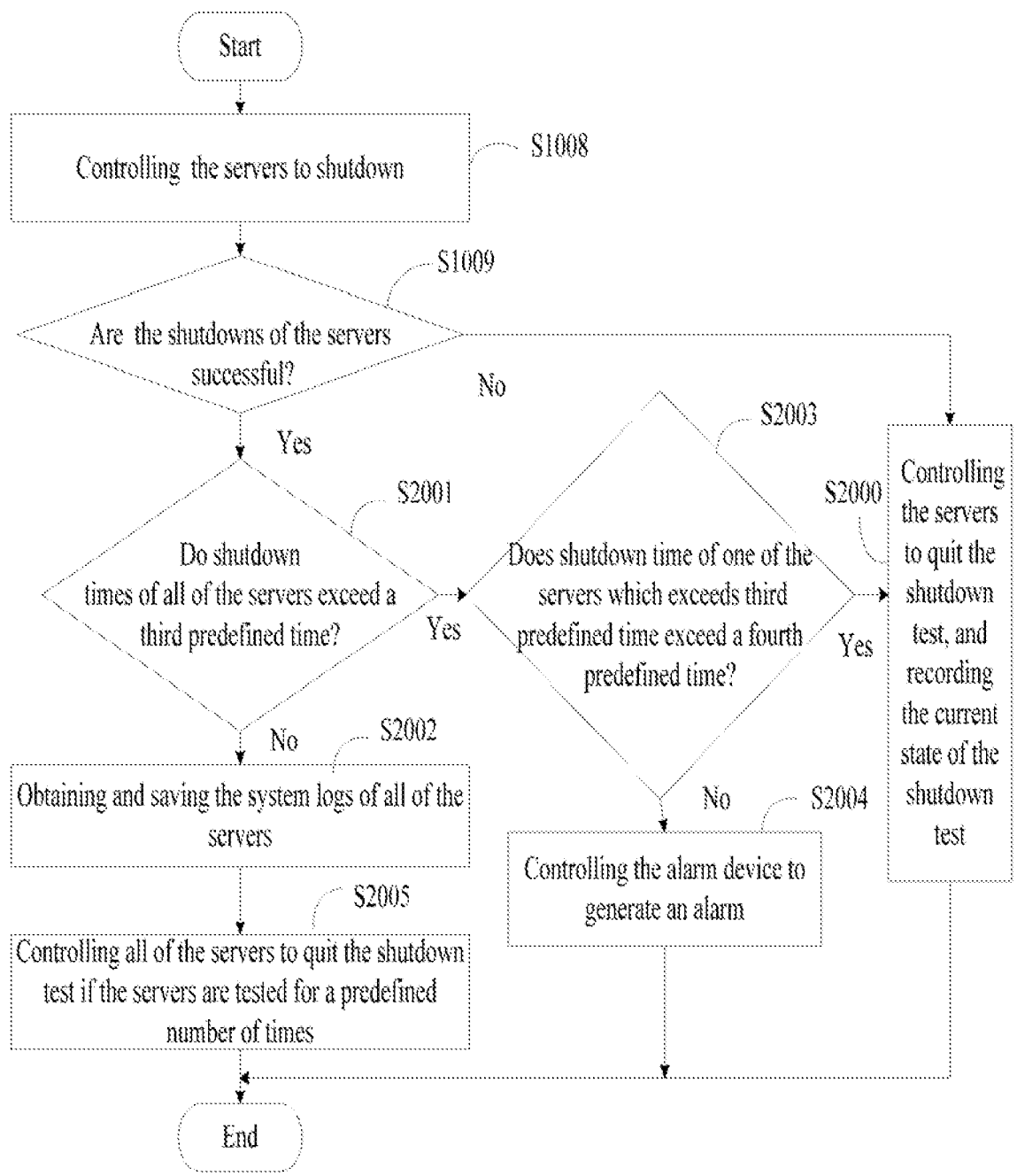
FIG. 4 is a flowchart of one embodiment of steps for testing shutdowns of the servers.

In the embodiment, the method for testing booting time of the servers 2 further comprises steps for testing shutdowns of the servers 2, and the steps are described as shown in FIG. 4.

In step S1008, the controlling module 108 controls the servers 2 to shutdown and perform a shutdown test.

In step S1009, the determination 102 determines whether the shutdowns of all of the server 2 are successful. If the shutdowns of all of the server 2 are successful, S2001 is implemented. Otherwise, if the shutdown of one of the servers 2 is unsuccessful, S2000 is implemented. In the embodiment, the determination 102 may send a "pin" instruction to each server 2 to detect whether the shutdown of each server 2 is successful.

In step S2000, the saving module 104 controls all of the servers 2 to quit the shutdown test, and records a current state of the shutdown test in a test log stored in the storage device 12. In the embodiment, the current state of the shutdown test may be the shutdown of one of the servers 2 is unsuccessful.

In step S2001, the determination 102 determines whether the shutdown times of all of the servers 2 exceed the third predefined time. If the shutdown times of all of the servers 2 do not exceed the third predefined time, step S2002 is implemented. If the shutdown time of one of servers 2 exceeds the third predefined time, step S2003 is implemented.

In step S2002, the saving module 104 saves the system log of each server 2 in the storage device 12.

In step S2003, the determination 102 determines whether the shutdown time of one of the servers 2 which exceeds the third predefined time further exceeds the fourth predefined time. If the shutdown time of the one of the servers 2 exceeds the third predefined time but does not exceed the fourth predefined time, step S2004 is implemented. Otherwise, if the shutdown time of the one of the servers 2 exceeds the third predefined time and further exceeds the fourth predefined time, step S2000 is repeated.

In step S2004, the alarming module 106 controls the alarm device 16 to alarm.

In step S2005, the controlling module 108 controls the power supply 3 to stop supplying electric power for the servers 2 if the servers 2 are tested for the above predefined number of times.

The tester can check the test logs and the system logs saved during the booting test and the shutdown test to determine whether the booting test and the shutdown test of the servers 2 are successful.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A host device, comprising:
   at least one processor; and
   a storage device storing a computer program including instructions that, which executed by the at least one processor, causes the at least one processor to:
   control a power supply to supply electric power for servers, and control the servers to boot and perform a booting test;
   determine whether the booting of all of the servers is successful;
   control all of the servers to quit the booting test, and record a current state of the booting test in a test log stored in the storage device, if the booting of one of the servers is unsuccessful;
   determine whether the booting times of all of the servers exceeds a first predefined time if the booting test of all of the servers is successful;
   save system logs of all of the servers in the storage device if the booting times of all of the servers do not exceed the first predefined time;
   determine whether the booting time of one of the servers exceeds a second predefined time if the booting time of the one of the servers exceeds the first predefined time;
   control an alarm device of the host device to alarm, if the booting time of the one of the servers exceeds the first predefined time but does not exceed the second predefined time;
   control all of the servers to quit the booting test, and record a current state of the booting test in a test log stored in the storage device, if the booting time of the one of the servers exceeds the first predefined time and further exceeds the second predefined time; and
   control all of the servers to quit the booting test if the servers are tested for a predefined number of times.

2. The host device claimed in claim 1, wherein the computer program including instructions further causes the at least one processor to:
   control the servers to shutdown and perform a shutdown test;
   determine whether the shutdowns of all of the servers are successful;
   control all of the servers to quit the shutdown test, and record a current state of the shutdown test in the test log stored in the storage device, if the shutdown of one of the servers is unsuccessful;
   determine whether the shutdown times of all of the servers exceed a third predefined time if the shutdowns of all of the server are successful;
   save the system logs of all of the servers if the shutdown times of all of the servers do not exceed the third predefined time;
   determine whether the shutdown time of one of the servers exceeds a fourth predefined time if the shutdown time of the one of the servers exceeds the third predefined time;
   control the alarm device of the host device alarm, if the shutdown time of the one of the servers exceeds the third predefined time but does not exceed the fourth predefined time;
   control all of the servers to quit the shutdown test, and record a current state of the shutdown test in a test log stored in the storage device, if the shutdown time of one of the servers exceeds the third predefined time and further exceeds the fourth predefined time; and
   controls the power supply to stop supplying electric power for the servers if the servers are tested for the predefined number of times.

3. The host device claimed in claim 2, wherein the second predefined time is the maximum booting time allowed by a customer of the servers, and the first predefined time is less than the second predefined time.

4. The host device claimed in claim 2, wherein the fourth predefined time is the maximum shutdown time allowed by the customer of the servers, and the third predefined time is less than the fourth predefined time.

5. The host device claimed in claim 1, wherein the booting time is defined as a time period between a time of supplying electric power for all of the servers and connecting the servers to the host device.

6. A method executable by a processor of a host device for testing booting of servers using a host device, the method comprising:
   controlling a power supply to supply electric power for the servers, and controlling the servers to boot and perform a booting test;
   determining whether the booting of all of the servers is successful;
   controlling all of the servers to quit the booting test, and recording a current state of the booting test in a test log stored in the storage device, if the booting of one of the servers is unsuccessful;
   determining whether the booting times of all of the servers exceed a first predefined time if the booting of all of the servers is successful;
   obtaining and saving system logs of all of the servers if the booting time of all of the servers do not exceed the first predefined time;
   determining whether the booting time of one of the servers exceeds a second predefined time if the booting time of the one of the servers exceeds the first predefined time;
   controlling an alarm device of the host device to alarm, if the booting time of the one of the servers exceeds the first predefined time but does not exceed the second predefined time;
   controlling all of the servers to quit the booting test, and recording a current state of the booting test in a test log stored in the storage device, if the booting time of the one of the servers exceeds the first predefined time and further exceeds the second predefined time;
   controlling all of the servers to quit the booting test if the servers are tested for a predefined number of times.

7. The method claimed in claim 6, further comprising:
   controlling the servers to shutdown and perform a shutdown test;
   determining whether the shutdowns of all of the servers are successful;
   controlling all of the servers to quit the shutdown test, and recording a current state of the shutdown test in the test log stored in the storage device, if the shutdown of one of the servers is unsuccessful;
   determining whether the shutdown times of all of the servers exceed a third predefined time if the shutdowns of all of the server are successful;
   obtaining and saving the system logs of all of the servers if the shutdown times of all of the servers do not exceed the third predefined time;
   determining whether the shutdown time of one of the servers exceeds a fourth predefined time if the shutdown time of the one of the servers exceeds the third predefined time;
   controlling an alarm device of the host device to alarm, if the shutdown time of the one of the servers exceeds the third predefined time but does not exceed the fourth predefined time;
   controlling all of the servers to quit the shutdown test, and recording a current state of the shutdown test in a test log stored in the storage device, if the shutdown time of the one of the servers exceeds the third predefined time and further exceeds the fourth predefined time;
   controlling the power supply to stop supplying electric power for the server if the servers are tested for the predefined number of times.

8. The method claimed in claim 7, wherein the second predefined time is the maximum booting time allowed by a customer of the servers, and the first predefined time is less than the second predefined time.

9. The method claimed in claim 7, wherein the fourth predefined time is the maximum shutdown time allowed by the customer of the servers, and the third predefined time is less than the fourth predefined time.

10. The method claimed in claim 6, wherein the booting time is defined as a time period between a time of supplying electric power for all of the servers and connecting the servers to the host device.

11. A non-transitory computer-readable storage medium having stored thereon instructions being executed by a processor of a host device, causes the processor to perform a method for testing booting of servers, the method comprising:
    controlling a power supply to supply electric power for the servers, and controlling the servers to boot and perform a booting test;
    determining whether the booting of all of the servers is successful;
    controlling all of the servers to quit the booting test, and recording a current state of the booting test in a test log stored in the storage device, if the booting of one of the servers is unsuccessful;
    determining whether the booting times of all of the servers exceed a first predefined time if the booting of all of the servers is successful;
    obtaining and saving system logs of all of the servers if the booting time of all of the servers do not exceed the first predefined time;
    determining whether the booting time of one of the servers exceeds a second predefined time if the booting time of the one of the servers exceeds the first predefined time;
    controlling an alarm device of the host device to alarm, if the booting time of the one of the servers exceeds the first predefined time but does not exceed the second predefined time;
    controlling all of the servers to quit the booting test, and recording a current state of the booting test in a test log stored in the storage device, if the booting time of the one of the servers exceeds the first predefined time and further exceeds the second predefined time;
    controlling all of the servers to quit the booting test if the servers are tested for a predefined number of times.

12. The storage medium claimed in claim 11, wherein the method further comprising:
    controlling the servers to shutdown and perform a shutdown test;
    determining whether the shutdowns of all of the servers are successful;
    controlling all of the servers to quit the shutdown test, and recording a current state of the shutdown test in the test log stored in the storage device, if the shutdown of one of the servers is unsuccessful;
    determining whether the shutdown times of all of the servers exceed a third predefined time if the shutdowns of all of the server are successful;
    obtaining and saving the system logs of all of the servers if the shutdown times of all of the servers do not exceed the third predefined time;

determining whether the shutdown time of one of the servers exceeds a fourth predefined time if the shutdown time of the one of the servers exceeds the third predefined time;

controlling an alarm device of the host device to alarm, if the shutdown time of the one of the servers exceeds the third predefined time but does not exceed the fourth predefined time;

controlling all of the servers to quit the shutdown test, and recording a current state of the shutdown test in a test log stored in the storage device, if the shutdown time of the one of the servers exceeds the third predefined time and further exceeds the fourth predefined time;

controlling the power supply to stop supplying electric power for the server if the servers are tested for the predefined number of times.

13. The storage medium claimed in claim 12, wherein the second predefined time is the maximum booting time allowed by a customer of the servers, and the first predefined time is less than the second predefined time.

14. The storage medium claimed in claim 12, wherein the fourth predefined time is the maximum shutdown time allowed by the customer of the servers, and the third predefined time is less than the fourth predefined time.

15. The storage medium claimed in claim 11, wherein the booting time is defined as a time period between a time of supplying electric power for all of the servers and connecting the servers to the host device.

* * * * *